(12) United States Patent
Berlioux et al.

(10) Patent No.: US 12,036,758 B2
(45) Date of Patent: Jul. 16, 2024

(54) SYSTEM AND METHOD WITH AZIMUTH CONTROL, FOR SORTING TIRE BEAD CORES

(71) Applicant: Compagnie Generale Des Etablissements Michelin, Clermont-Ferrand (FR)

(72) Inventors: Loic Berlioux, Clermont-Ferrand (FR); Yann Faure, Clermont-Ferrand (FR)

(73) Assignee: COMPAGNIE GENERALE DES ETABLISSEMENTS, Clermont-Ferrand (FR)

( * ) Notice: Subject to any disclaimer, the term of this patent is extended or adjusted under 35 U.S.C. 154(b) by 913 days.

(21) Appl. No.: 17/053,452

(22) PCT Filed: May 13, 2019

(86) PCT No.: PCT/FR2019/051073
§ 371 (c)(1),
(2) Date: Nov. 6, 2020

(87) PCT Pub. No.: WO2019/220046
PCT Pub. Date: Nov. 21, 2019

(65) Prior Publication Data
US 2021/0245466 A1    Aug. 12, 2021

(30) Foreign Application Priority Data

May 14, 2018  (FR) ...................................... 1854008

(51) Int. Cl.
*B29D 30/48* (2006.01)

(52) U.S. Cl.
CPC ........ *B29D 30/48* (2013.01); *B29D 2030/487* (2013.01)

(58) Field of Classification Search
CPC .............. B29D 2030/488; B29D 30/48; B29D 2030/487; B21F 37/00
See application file for complete search history.

(56) References Cited

U.S. PATENT DOCUMENTS

| 3,945,577 | A | | 3/1976 | Kaneko et al. | |
|---|---|---|---|---|---|
| 4,806,196 | A | * | 2/1989 | Smith | B29D 30/48 156/422 |

(Continued)

FOREIGN PATENT DOCUMENTS

| EP | 0834393 A2 | 4/1998 |
|---|---|---|
| EP | 2537667 A1 | 12/2012 |

(Continued)

*Primary Examiner* — Cedrick S Williams
(74) *Attorney, Agent, or Firm* — Dicksinson Wright PLLC; Steven C. Hurles (57) ABSTRACT

The method includes procuring an annular core 3 of main axis Z3. The core is closed on itself by a core join 6 which occupies, in azimuth about said main axis Z3, a first angular sector S6. Then, a braiding is performed by helically winding, about the core 3, a braid wire 4 that is held closed by a braid join 8, of sleeve 9 type, which occupies a second angular sector S8. A method during which a registration element 16, with respect to which the position of the first angular sector S6 is known, is sought and detected on the core 3, and the azimuthal orientation of the core 3 is adapted during the braiding, with reference to said registration element 16, so that the second angular sector S8 occupied by the braid join 8 does not overlap the first angular sector S6 occupied by the core join 6.

14 Claims, 4 Drawing Sheets

(56) References Cited

U.S. PATENT DOCUMENTS 5,141,033 A      8/1992   Rausch
5,385,621 A *   1/1995   Golightly ................ B29B 15/14
                                                          242/419.9

FOREIGN PATENT DOCUMENTS

| JP | S51124178 A | 10/1976 |
| KR | 101765795 B1 | 8/2017 |
| WO | 2011030764 A1 | 2/2013 |

* cited by examiner

SYSTEM AND METHOD WITH AZIMUTH CONTROL, FOR SORTING TIRE BEAD CORES

CROSS-REFERENCE TO RELATED APPLICATIONS

This application claims priority to and the benefit of PCT Patent Application No. PCT/FR2019/051073, filed May 13, 2019, entitled "SYSTEM AND METHOD WITH AZIMUTH CONTROL, FOR SORTING TIRE BEAD CORES" and French Patent Application No. 1854008, filed May 14, 2018, entitled "SYSTEM AND METHOD WITH AZIMUTH CONTROL FOR SORTING TIRE BEAD CORES."

BACKGROUND OF THE INVENTION

1. Field of the Invention

The present invention relates to the field of the production of reinforcing bead wires which are intended to reinforce tires, notably pneumatic tires, in order to ensure that such tires are held on a rim.

2. Related Art

As is known per se, a bead wire takes the form of an annular element made of rigid material, generally metallic, which can consist of a monolithic strand or, preferably, of a braid comprising several interleaved strands.

It is in particular known practice, for example, to manufacture a bead wire by first of all producing an annular core, which is obtained by bending back on itself a first wire, preferably metallic, the ends of which are fixed to one another at a join called "core join", then by helically winding at least one wire, preferably metallic, called "braid wire", about said core.

In order to guarantee that the braid wire is held on the core, it is necessary, once the braiding operation is completed, that is to say once said metal braid wire has been helically wound about the core, to fix the two free ends of said braid wire to one another, by producing a join called "braid join", for example by means of a sleeve that is crimped jointly on the two ends of the braid wire.

SUMMARY OF INVENTION

The inventors have however discovered that such a manufacturing method could, in some circumstances, and notably if the cores were randomly disposed on the braiding station, lead to the production of bead wires exhibiting certain irregularities of form, certain imbalances, even potentially some zones of weakness, because the braid join and the core join are too close together.

The objects assigned to the present disclosure consequently aim to remedy the abovementioned drawbacks and propose a bead wire preparation installation which guarantees, reproducibly and reliably, quality bead wire production.

The objects assigned to the invention are achieved by means of an installation for preparing bead wires intended for the reinforcement of a tire, such as a pneumatic tire, said installation comprising:
  a fetching station, arranged to fetch a core which forms a ring having a main axis Z3, said core being, to this end, kept closed on itself at a join called "core join" which occupies, in azimuth about said main axis Z3, a first angular sector,
  a braiding station, arranged to interleave at least one wire, called "braid wire", helically about the core, over at least one turn about the main axis Z3, by providing, in azimuth about the main axis Z3, a second angular sector which is intended to accommodate a join, called "braid join", between a first end section of the braid wire and a second end section of the braid wire in order to keep said braid wire closed on itself about said main axis Z3,
said installation being characterized in that it comprises an azimuth checking system which comprises:
  a detection device arranged to detect, on the core, a registration element with respect to which the position of the first angular sector is known,
  and a positioning device which makes it possible to adapt the azimuthal orientation of said core, with reference to said registration element, for the implementation of said core on the braiding station, such that the second angular sector provided by the braiding station for the braid join does not overlap the first angular sector occupied by the core join.

Advantageously, by checking the respective azimuthal positions of the core join and of the braid join, these joins can be allocated at distinct angular positions chosen about the main axis Z3, and thus, in particular, avoid superimposing these joins in one and the same angular sector.

That way, concentrating the joins, and therefore creating zones of weakness, significant surface irregularities or irregularities of cross section of the core, or even significant imbalances, are avoided.

BRIEF DESCRIPTION OF DRAWINGS

Other objects, features and advantages of the invention will become apparent in more detail on reading the following description, and using the attached drawings, supplied in a purely illustrative and nonlimiting manner, among which.

DETAILED DESCRIPTION OF THE ENABLING EMBODIMENT

The present invention relates to an installation 1 for preparing bead wires 2 which are intended for the reinforcement of a tire, such as a pneumatic tire.

Figure 6:
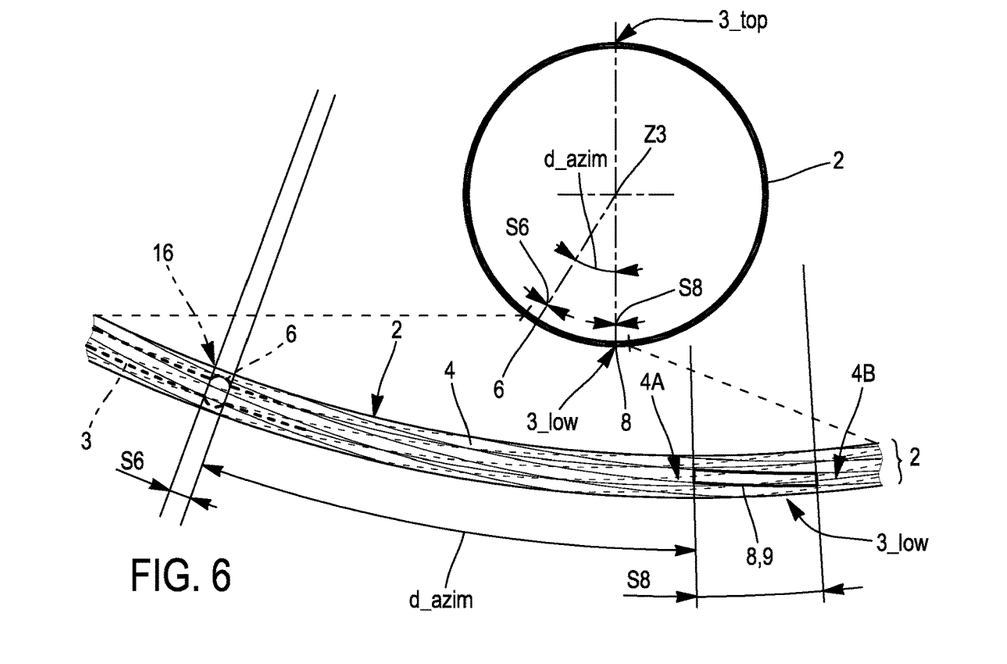
FIG. 6 illustrates, by a front view, an example of angular distribution of the core join and of the braid join with respect to one another within a bead wire, in accordance with the principle implemented by the invention.

As is known per se, as can be seen in FIG. 6, a bead wire 2 comprises a core 3, here represented by dotted lines in FIG. 6, around which at least one braid wire 4 is wound.

The core 3 itself can be single-stranded, that is to say formed by a single monolithic core wire, or, as a variant, multi-stranded, that is to say formed by a plurality of interleaved core wires.

The core 3, or the core wires, will be able to be formed in any appropriate material, that is sufficiently rigid and has a tensile strength greater than a predetermined threshold.

Preferably, the core 3, or the core wires, will be metallic, for example made of steel.

As a variant, it would however be possible to use another material, for example a suitable polymer, or a suitable mixture of polymers, without departing from the scope of the disclosure.

Preferably, regardless of the material used to form the core wire or wires, said material will be able to be magnetizable, so as notably to be able to receive a magnetic marking 16_magn, as will be detailed hereinbelow, by the simple local application of a suitable magnetic field.

Likewise, the braid wires 4 will be able to be formed in any appropriate material, that is sufficiently rigid and that has a tensile strength greater than a predetermined threshold.

Preferably, the braid wire or wires 4 will be metallic, for example made of steel.

As a variant, it would however be possible to use another material, for example a suitable polymer, or a suitable mixture of polymers, without departing from the scope of the disclosure.

Figure 1:
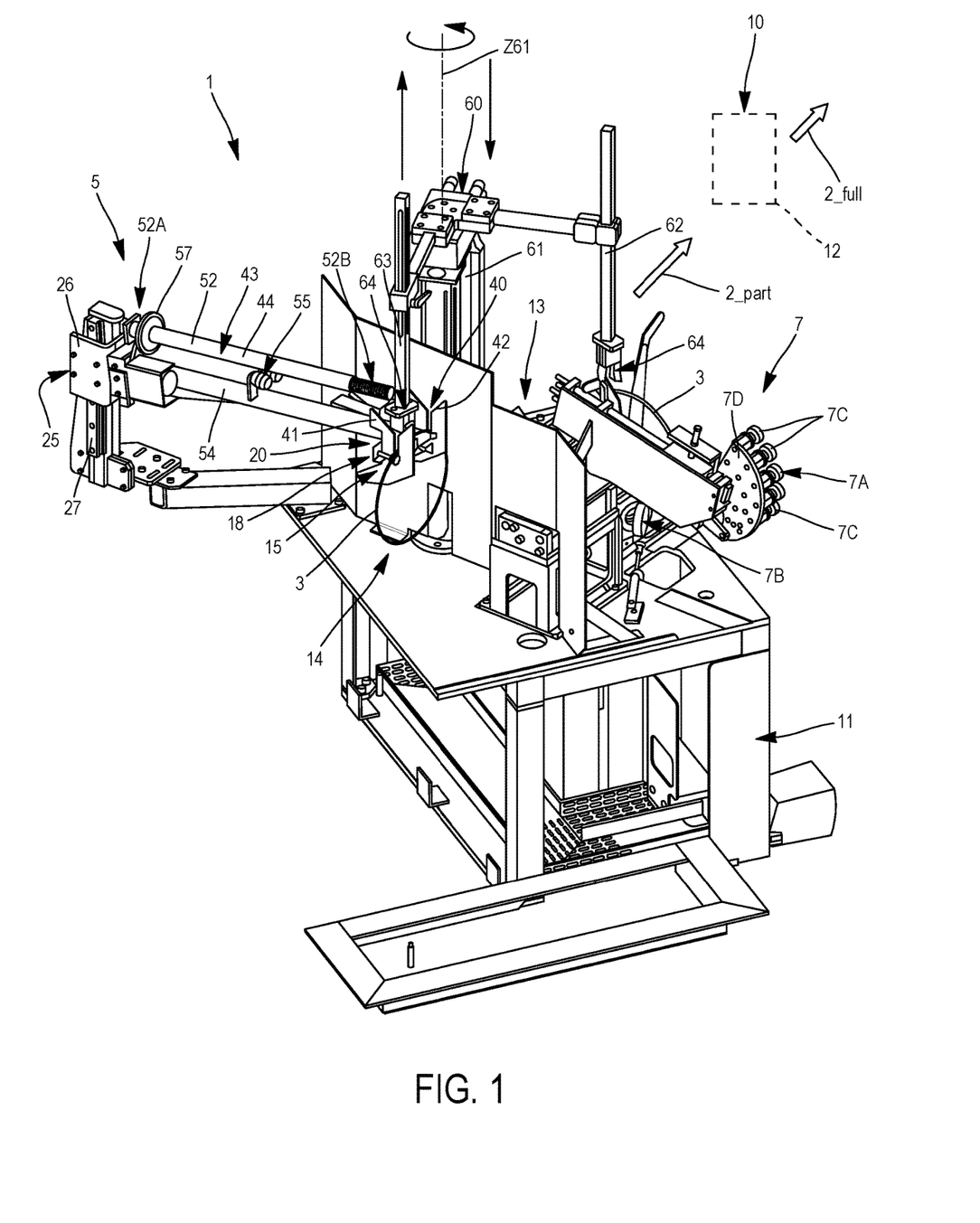
FIG. 1 illustrates, by a perspective view, an overview of an installation according to the invention.
Figure 2:
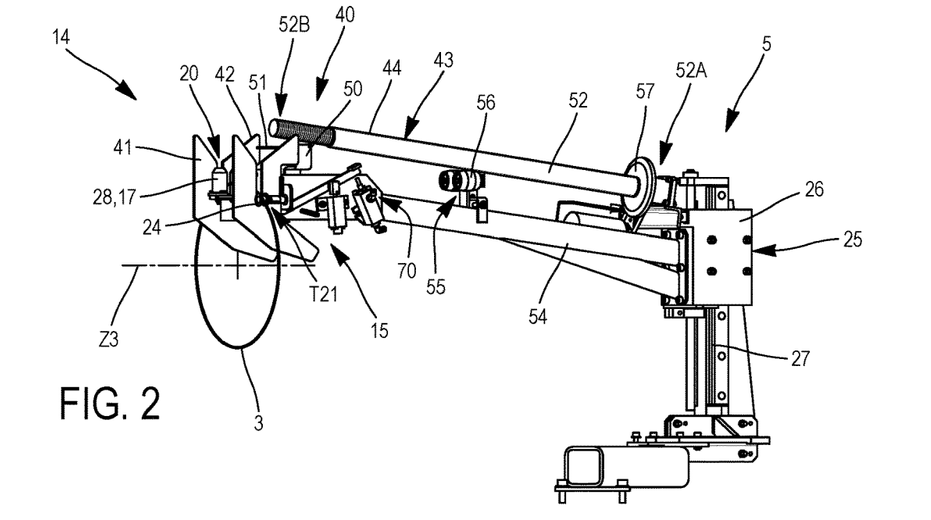
FIG. 2 illustrates, by a perspective view, a subassembly of the installation of FIG. 1 comprising a fetching station and an azimuth checking system.
Figure 5:
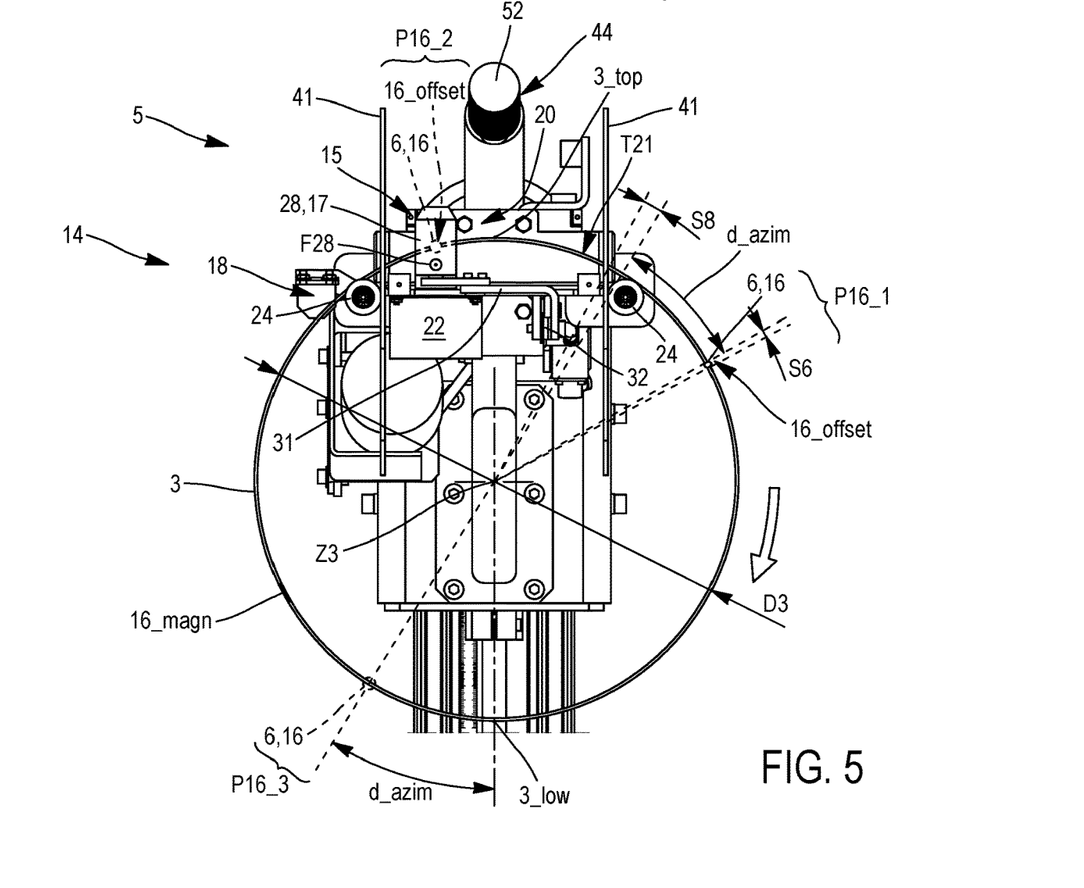
FIG. 5 illustrates, by a front view, the principle of detection and of azimuthal positioning of a core engaged in the azimuth checking system.

As is illustrated in FIGS. 1 and 2, the installation 1 comprises a fetching station 5, arranged to fetch a core 3 which forms a ring having a main axis Z3, said core 3 being, to this end, kept closed on itself at a join called "core join" 6 which occupies, in azimuth about said main axis Z3, a first angular sector S6, as can be seen in FIGS. 5 and 6.

The main axis Z3 corresponds, by convention, to the axis which is normal to the annular surface delimited by the core 3, and which passes through the center of gravity of said surface. Thus, when the core 3 forms a circular ring, which is preferably the case, the main axis Z3 corresponds to the central axis of said circular ring.

Preferably, as is illustrated notably in FIG. 5, the core join 6 may be formed by a weld, and more specifically by a weld bead, and particularly when the core 3 is single-stranded.

As a variant, the core join 6 could be formed by a core sleeve, in particular when the core 3 is multi-stranded.

Obviously, any kind of core join 6, for example by binding wire, may be employed without departing from the scope of the disclosure.

Purely indicatively, the angular extent of the first angular sector S6 may be substantially between 1 degree and 20 degrees in azimuth about the main axis Z3, and more particularly between 1 degree and 10 degrees in azimuth about the main axis Z3.

More particularly, in the case of a core join 6 produced by welding, it is preferable for the arc length occupied by the weld bead not to exceed 5 mm, which can correspond, in proportional terms, to a first angular sector S6 of substantially between 1 degree and 3 degrees, for core diameters 3 which are intended to include tires of nominal dimensions lying between 24 inches and 13 inches, and which will thus be able to have, as an indication, an overall diameter D3 of substantially between 645 mm (for 24-inch tires) and 342 mm (for 13-inch tires).

In the case of a core join 6 produced by a core sleeve, the arc length occupied by said core sleeve will preferably not exceed 40 mm, and more particularly, preferably, will not exceed 18 mm to 22 mm.

In practice, that may correspond to a first angular sector S6 that is equal to or less than 15 degrees, preferably less than 10 degrees, and more particularly approximately 5 degrees to 8 degrees, notably if considering these same ranges of core 3 diameters intended to include tires of dimensions lying between 24 inches and 13 inches.

The installation 1 then also comprises, as can be seen in FIG. 1, a braiding station 7, which is arranged to interleave at least one wire, called "braid wire" 4, helically about the core 3, and do so over at least one turn of the main axis Z3.

The braiding station 7 will, to this end, be able to include a driving carousel 7A which receives the core 3 and drives said core 3 in azimuthal rotation about the main axis Z3 and a rotary reel 7B, which rotates yaw-wise about the tangent to the core 3, at a chosen point of the braiding station 7 through which the trajectory of the core 3 as defined by the carousel 7A passes, and from which the braid wire 4 is wound out, under a controlled mechanical tension, so that the composition of the movements of the carousel 7A and of the reel 7B produces the helical winding of the braid wire 4 about the core 3.

As an example, the carousel 7A will be able to comprise opposing jaws 7D, one of which is visible here in FIG. 1, which each form a "roller path" defined by a succession of rollers 7C, of mutually parallel axes, which are disposed according to an angular sector of the rotational trajectory that is desired for the core 3 during the braiding operation.

Said jaws 7D will be able to be brought inside the perimeter delimited by the core 3, then separated from one another centrifugally radially until their rollers 7C come to be pressed against the core 3 and lightly tension said core 3. This tensile prestressing will allow the carousel 7A to mesh by friction on the core 3 in order to drive the latter in rotation.

Regardless of the arrangement retained for the braiding station 7, the interleaving of the braid wire 4 over at least one turn, that is to say over at least 360 degrees, and preferably successively over several entire turns, about the main axis Z3, makes it possible, on the one hand, to reinforce the entire length of the core 3, and therefore ultimately the entire length of the bead wire 2, by means of said braid wire 4, and, on the other hand, to close the braid wire 4 on itself to ensure that said braid wire 4 is held on the core 3.

To this end, it will be noted that, during the braiding operation, a second angular sector S8 is provided, in azimuth about the main axis Z3, which is intended to accommodate a join, called "braid join" 8, between a first end section 4A of the braid wire 4 and a second end section 4B of the braid wire 4 in order to keep said braid wire 4 closed on itself about said main axis Z3, as is illustrated in FIG. 6.

The braid join 8 will be able to be produced, after the braiding operation, by any appropriate braid joining means 9 making it possible to link and fix to one another the end sections 4A, 4B of the braid wire 4, which form the longitudinal ends of the braid wire 4 considered.

The braid joining means 9 will be able, for example, to be a weld joint, or an added binding wire, or even, preferably, a sleeve, called "braid sleeve", which is engaged and crimped around the two end sections 4A, 4B, as is illustrated in FIG. 6.

For convenience of description, the braid joining means 9 will be able to be likened to a braid sleeve 9 hereinbelow.

The braid join 8 will be able to be produced on an appropriate fixing station 10, which will possibly be able to be situated on the braiding station 7, or, preferably, downstream of said braiding station 7, on a machine that is separate from the braiding station, as is illustrated by dotted lines in FIG. 1.

Preferably, regardless of its location, said fixing station 10 will be a sleeve-coupling station, implementing a braid sleeve 9.

To this end, the installation therefore preferably comprises a sleeve-coupling station 10, which is arranged to join and fix to one another the first end section 4A of the braid wire 4 and the second end section 4B of the braid wire 4 by means of a sleeve, called "braid sleeve" 9, which is crimped, in the second angular sector S8.

In practice, the second angular sector S8 will correspond to the angular sector occupied, once the braid joint 8 is produced, by the braid joining means 9 (weld joint, binding wire, or, preferably, braid sleeve) which ensures said braid join 8.

Obviously, in the braiding operation, it will be possible to arrange the braid wire 4 in such a way that that the end sections 4A, 4B of said braid wire are left, on standby, with a surplus length, so that said end sections 4A, 4B of the braid wire 4 can then be cut to be adjusted lengthwise, in the fixing operation, before the implementation of the braid joining means 9, and notably before crimping in the braid sleeve 9.

Obviously, in the braiding, the location of the second angular sector S8, that is reserved for the placement of the joining means 9, will be planned accordingly.

According to one possible implementation, at the end of the actual braiding operation, the end sections 4A, 4B of the braid wire 4, left free on standby before the production of the braid join 8, cross at a point called "crossing point", and the second angular sector S8 will be able to correspond to said crossing point, and more particularly to a segment of predetermined size which will be attached to said crossing point of two end sections 4A, 4B of the braid wire 4, and for example to an angular sector of predetermined size which will be substantially centered, angularly, on said crossing point.

Thus, the braiding operation will be performed by having first positioned the core 3 appropriately on the braiding station 7, so that, when the braiding operation is finished, the crossing point of the two free end sections 4A, 4B of the braid wire 4 which results from said braiding operation is contained in a second predetermined angular sector S8, whose position is, as will be seen hereinbelow, chosen and controlled with respect to the first angular sector S6 occupied by the core join 6.

For convenience of description, it will be possible to distinguish, as required, for example in FIG. 1:
- a "semi-finished bead wire" 2_part, which comprises the core 3 surrounded by its braid wire 4 whose end sections 4A, 4B are left temporarily on standby pending production of the braid join 8;
- a "finished bead wire" 2_full, which comprises the core 3 surrounded by its braid wire 4 which is closed and effectively held by the braid join 8.

According to one possible configuration of the installation 1, the fetching station 5 and the braiding station 7 can be combined on one and the same frame 11, as is illustrated in FIG. 1.

Such an arrangement will in fact offer a good compactness, and a good accuracy, in as much as it makes it possible to define and retain the information on the position and orientation of the core 3 within a common machine reference frame, between the different stations, notably between the fetching station 5 and the braiding station 7.

The fixing station 10, here the sleeve-coupling station 10 allowing for the crimping of the braid sleeve 9 onto the end sections 4A, 4B of the braid wire, can be situated either on this same frame 11 bearing the fetching station 5 and the braiding station 7, or at a distance from said frame 11, on a second, separate frame 12, to which the cores 3 covered with their braid wire 4 can be transferred after braiding.

In all cases, it will be possible to provide a buffer storage station 13 which follows the braiding station 7 and which precedes the sleeve-coupling station 10, so as to form a buffer storage zone between these two braiding and then sleeve-coupling operations.

According to the disclosure, the installation 1 comprises an azimuth checking system 14.

Said azimuth checking system 14 first of all comprises a detection device 15 which is arranged to detect, on the core 3, a registration element 16 with respect to which the position of the first angular sector S6 is known.

Advantageously, the registration element 16 makes it possible to define and identify the origin of a coordinate system, attached to the core 3, in which the position, in this case the angular position in azimuth about the main axis Z3, and the extent of the first angular sector S6, are known.

The registration element 16 thus forms a reference mark, which provides information on the position of the first angular sector 6, and which therefore allows the detection device 15 to perform an acquisition of the origin of the coordinate system (here an azimuth orientation coordinate system) attached to the core 3.

It will be noted that the registration element 16 can physically coincide with the first angular sector S6, and notably with a limit of said first angular sector S6, or even be situated outside of said first angular sector S6, at a known angular distance from said first angular sector S6 in azimuth about the main axis Z3.

The registration element 16, preferably unique on the perimeter of the core 3, will be able to be of any kind, provided that it is possible to identify said registration element 16 on the core 3 and use it as reference point to define an azimuthal position and/or a curvilinear abscissa about the main axis Z3, with respect to said reference point.

As an example, the registration element 16 will be able to be formed by a particular relief, such as the core join 6 itself if said core join 6 forms a protuberance or, on the contrary, a hollow that is recognizable on the surface of the core 3.

As a variant, the registration element 16 could be an optical marking, such as an opaque or reflecting mark produced for example by a paint, or even a magnetic marking obtained by magnetization of a particular zone of the core 3, etc.

Figure 7:
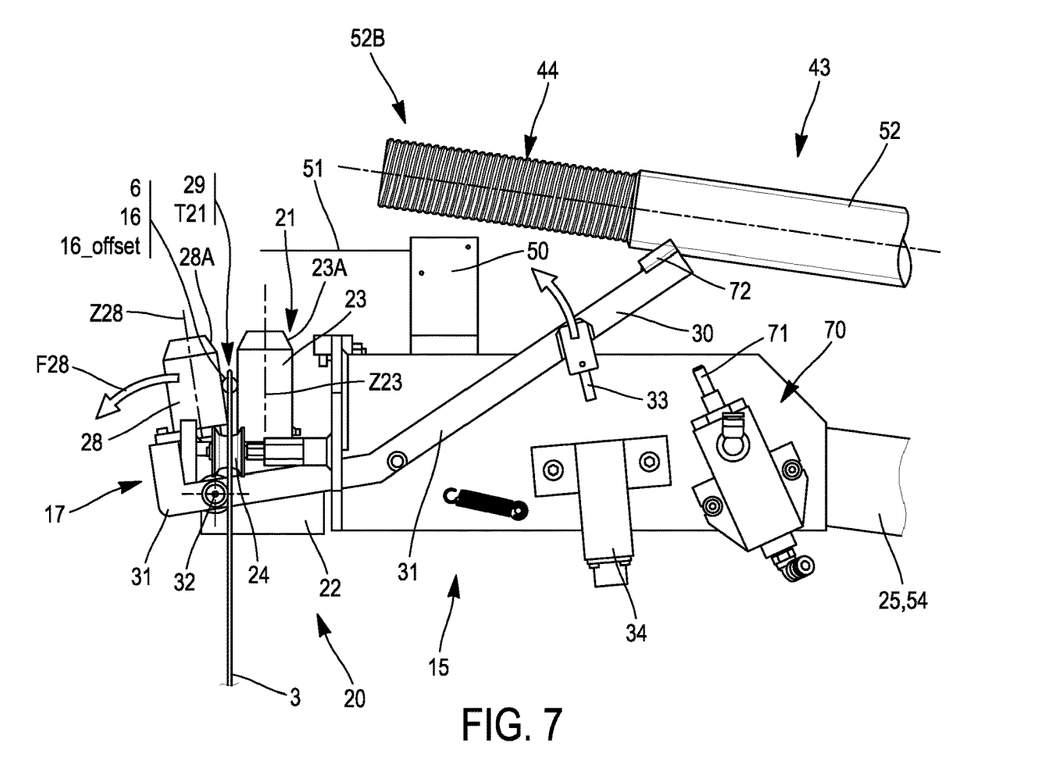
FIG. 7 illustrates, by a side view with material cutaway, an example of detection of the core join, here a weld bead, by a mechanical feeler with swivelling roller coupled to a lever which acts on a sensor, here an inductive sensor of solenoid type.

According to one possible embodiment, the detection device 15 can comprise an offset sensor 17, which is arranged to scan the surface of the core 3 in order to detect an offset 16_offset which is formed on the surface of the core 3 and which constitutes the registration element 16, as is illustrated in FIGS. 5 and 7.

The offset 16_offset can be formed by any appropriate relief, protruding or, on the contrary, indented, such as a weld bead present at the core join 6, as is illustrated in FIG. 7, or such as a shoulder, a notch, a flat, an indentation, an overthickness of material linked to the presence of a sleeve, etc., provided that said offset 16_offset forms an irregularity that is identifiable, reproducibly from one core 3 to another, by its form or by its dimensions.

As an indication, the offset sensor 17 will be able to be arranged to detect an offset 16_offset having a relief height (protruding or hollowed out), here a radial variation—preferably protruding—with respect to the main axis Z3, of at least 0.5 mm, and for example between 0.5 mm and 2 mm, and preferably between 0.5 mm and 1 mm.

The offset sensor 17 will be able to use any appropriate detection technology, and form, for example, a mechanical feeler pressed against the surface of the core 3, an inductive or capacitive sensor, an optical sensor sensitive to the variation of section of the core 3 due to the offset 16_offset, etc.

As an example, the passing of the offset 16_offset in front of the offset sensor 17 will be able to provoke the appearance of a signal of rising edge or falling edge type, with which the origin of the coordinate system attached to the core 3 will be associated.

According to another possible element, which can be an alternative to or complement the presence of an offset sensor 17, the detection device 15 can comprise a magnetic sensor 18 which is arranged to detect, on the core 3, a registration element 16 formed by a magnetic marking 16_magn, and/or an optical sensor arranged to detect, on the core, a registration element 16 formed by an optical marking 16 opt.

A magnetic marking 16_magn will notably be able to be produced, as is known per se, by proceeding, prior to the fetching of the core 3, with a temporary and local magnetization of the core wire or wires, at a point of the core 3 that is chosen as appropriate.

It will for example be possible to produce said magnetic marking 16_magn at a point diametrically opposite the core join 6 with respect to the main axis Z3, that is to say situated substantially at 180 degrees in azimuth from said core join 6, as is illustrated in FIG. 5.

It will also be noted that, preferably, it will be possible to use an offset sensor 17 when dealing with single-stranded cores 3 whose core join 6 is formed by a weld bead, in order to use said weld bead as registration element 16 of offset 16_offset type, while preference will be given to using a magnetic marking 16_magn for the multi-stranded cores 3 with sleeve-coupled core join 6.

In fact, in the case of a multi-stranded core 3 with sleeve-coupled core join, it is possible that the core sleeve, depending on its form and its arrangement, does not systematically form, unlike a weld bead, an overthickness which can effectively be detected by a mechanical feeler. It may therefore be more shrewd and more reliable to use a magnetic marking 16_magn.

Advantageously, the provision on the installation 1 of several complementary types of sensors 17, 18 capable of identifying different types of registration elements 16, and in particular the provision of both an offset sensor 17 and a magnetic sensor 18, will make it possible to process, on one and the same multipurpose installation 1, several types of cores 3, and more particularly both single-stranded cores 3 with welded core join 6 and multi-stranded cores with sleeve-coupled core join 6.

According to the disclosure, the azimuth checking system 14 also comprises a positioning device 20 which makes it possible to adapt the azimuthal orientation of the core 3, with reference to the registration element 16, for the implementation of said core 3 on the braiding station 7, so that the second angular sector S8 provided by the braiding station 7 for the braid join 8 does not overlap the first angular sector S6 occupied by the core join 6.

By virtue of the azimuth check that is thus applied, there is an assurance that the core 3 will be placed non-randomly, in particular at the moment when the braiding operation begins and is performed, so that, at the end of the braiding and, ultimately, in the bead wire 2 obtained, an angular superimposition of the braid join 8 and of the core join 6 is avoided.

Advantageously, the detection device 15 in fact makes it possible to inspect the core 3 so as to detect thereon a registration element 16 which makes it possible to attach a coordinate system to said core 3, and establish a relationship between this coordinate system and the reference frame of the installation 1, and in particular establish a relationship between this coordinate system, attached to the core 3, and the machine origin of the braiding station 7.

The positioning device 20, for its part, makes it possible, before the braiding operation is performed, to position the core 3, non-randomly and reproducibly from one core 3 to another, in said reference frame of the installation 1, and more particularly in the reference frame of the braiding station 7, so that it is possible to perform the braiding operation with respect to the identified registration element 16, and therefore by taking into consideration the azimuthal position of the first angular sector S6 occupied by the core join 6, so that the second angular sector S8 which results from said braiding operation and which accommodates the braid join 8 is angularly remote from the first angular sector S6 in which the core join 6 is located.

By controlling the distribution of the first and second angular sectors S6, S8, and more particularly by setting the angular range of the core 3, and more globally the angular range of the bead wire 2, within which the presence of the second angular sector S8 is allowed, and therefore by choosing the position of the braid join 8, with respect to the position of the core join 6, the concentration or superimposition in one and the same angular sector of the singular points, in this case of the joins 6, 8, which potentially constitute zones of irregularity of form or of irregularity of weight distribution, or zones of lesser mechanical strength, are advantageously avoided.

Preferably, as is notably illustrated in FIGS. 5 and 6, the azimuth checking system 14 is arranged to reproducibly place the second angular sector S8, provided for the braid join 8, at a minimal azimuthal distance d_azim from the first angular sector S6 occupied by the core join 6, called "azimuthal separation distance" d_azim, which is equal to or greater than 10 degrees, and/or, preferably, equal to or greater than 40 mm of arc length.

Such an azimuthal separation distance d_azim makes it possible to guarantee, in the most systematic possible way, a sufficient separation of the first and second angular sectors S6, S8, which notably avoids the formation of a zone of weakness, or an excessively marked imbalance, by preventing the core join 6 and the braid join 8 from being too close to one another.

Likewise, by avoiding superimposing the weld of the core join 6 with the sleeve 9 of the braid join 8, the formation on the bead wire 2 of a protuberance of material which would notably be likely to induce a premature wear of certain parts of the pneumatic tire equipped with said bead wire 2, is avoided.

By convention, as is illustrated in FIG. 6, the minimal azimuthal separation distance d_azim may be measured between the respective limits of the first and second angular sectors S6, S8, which are closest to one another, that is to say may correspond to an azimuth angle which separates the limit of the first angular sector S6 which is closest to one of the two limits of the second angular sector S8, on the one hand, from said one of the two limits of the second angular sector S8, on the other hand.

In practice, the azimuthal separation distance d_azim may preferably be between 10 degrees and 120 degrees, and more particularly between 10 degrees and 60 degrees, even between 10 degrees and 30 degrees, notably to favor the robustness and the equilibrium of the bead wire 2.

Advantageously, the disclosure will thus aim to guarantee, in the most systematic possible way, that each bead wire 2 produced has a relative arrangement of the braid join 8 with respect to the core join 6 which satisfies this criterion of controlled azimuthal separation distance d_azim.

It will be noted that the azimuthal separation distance d_azim will be able to be expressed equally either in the form of an azimuth angle, as indicated above, or, notably for convenience in controlling the azimuth checking system 14, in the form of an arc length, considered along the core 3.

As an indication, and in particular on bead wires 2 of a diameter suited to tires of dimensions lying between 13 inches and 24 inches, the azimuthal separation distance d_azim may be equal to or greater than 40 mm, preferably equal to or greater than 50 mm, and more globally between 40 mm and a value equal to 90%, even 95%, of half the length of the perimeter of the core 3 about the main axis Z3.

According to a preferential exemplary implementation, the azimuthal separation distance d_azim, expressed in arc length, will be chosen to be equal to 55 mm.

Preferably, the azimuth checking system 14 will be automated, in order to guarantee the speed, accuracy, and reproducibility of the detection of the registration element 16, by a detection device 15 which is automatic, then of the azimuthal positioning of the core 3, by a positioning device 20 which is automatic.

Preferably, the installation 1 comprises a guiding and driving mechanism 21 which is arranged to guide and drive the core 3 in azimuthal rotation about its main axis Z3, along a path called "core path" T21 defined by said guiding and driving mechanism 21, so as to be able first of all to run the core 3, here preferably through the detection device 15 and more particularly in front of the corresponding sensor or sensors 17, 18, until the detection device 15 detects the registration element 16, then adjust the azimuthal position of said core 3 with respect to said registration element 16, according to a predetermined configuration, as defined by the positioning device 20.

In FIGS. 2, 3, 5 and 7, the core path T21 is, physically, embodied by the core 3 which is engaged in the guiding and driving mechanism 21.

The guiding and driving mechanism 21 can be driven by a drive motor 22, preferably electrical.

This drive motor 22 preferably transmits a movement to a drive member 23 which acts in turn on the core 3 to drive the latter in azimuthal rotation.

Figure 3:
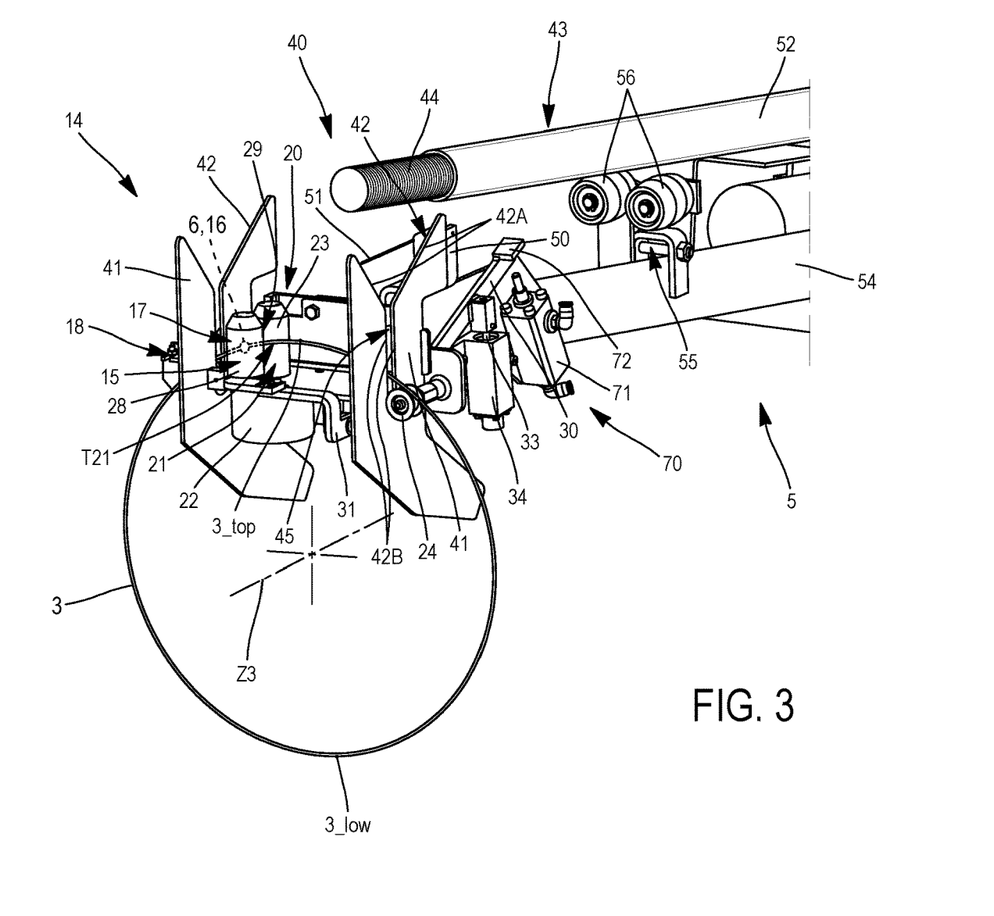
FIG. 3 illustrates, by a perspective detail view, a portion of the subassembly of FIG. 2, within which a core is engaged in a guiding driving mechanism of the azimuth checking system.

Preferably, as can be seen in FIGS. 3 and 7, said drive member 23 can be formed by a drive roller, preferably with vertical axis, which comes to bear against the core 3 to drive the latter by friction. Hereinbelow, it will therefore be possible, for convenience, to liken the drive member 23 to a friction drive roller.

As is illustrated schematically in FIG. 5, the guiding and driving mechanism 21, and more globally the azimuth checking system 14, will preferably be able to operate as follows:

initially, the core 3 is received in the core path T21, in any azimuthal position, in which the initial position P16_1 of the registration element 16, here the position of the core join 6, which is illustrated by a solid line in FIG. 5, is unknown;

the guiding and driving mechanism 21 then displaces the core 3 in azimuthal rotation about the main axis Z3, here in the clockwise direction in FIG. 5, until the registration element 16 passes in front of the sensor of the detection device 15, here more particularly until the core join 6 passes in front of the offset sensor 17; said registration element 16 is then located in a second position, called "detection position" P16_2, illustrated by dotted lines in FIG. 5, which position is thus well identified with respect to the reference frame of the installation 1;

once the registration element 16 is detected, the guiding and driving mechanism 21 can then continue the azimuthal rotation of the core 3, in the same direction (here in the clockwise direction), according to a predetermined angular travel, called "positioning travel", until the core 3 reaches a configuration which makes it possible to observe the desired azimuthal separation distance d_azim between the first angular sector S6 and the second angular sector S8; the registration element 16 (and therefore the core join 6) then occupies a corresponding third position P16_3, called "final position" P16_3, as is illustrated by dotted lines in FIG. 5.

The positioning travel will for example be able to be ensured by maintaining the power supply setpoint of the drive motor 22, after the registration element 16 has been detected, for a predetermined time which will have been established by prior calibrations.

However, it will of course be possible to perform, by any appropriate sensor, a measurement of the angular displacements in azimuth of the core 3, or, in an equivalent manner, a linear measurement of the length of arc travelled by said core 3, and therefore perform an indexing and a measurement of the positions of the core join 6, of the first angular sector S6 and/or of the registration element 16 within the reference frame of the installation 1, and more particularly within the reference frame associated with the positioning device 20 and the braiding station 7.

For example, these measurements will be able to be supplied by means of a position sensor which is incorporated in the drive motor 22, such as a sensor of resolver type.

In the exemplary implementation corresponding to an azimuth checking system 14 arrangement in accordance with FIG. 5, and in which the registration element 16 coincides with the core join 6, and more particularly when the registration element 16 is formed by an offset 16_offset corresponding to the weld bead of the core join 6, then the positioning travel, which makes it possible to go from the detection position P16_2 to the final position P16_3, will be able to be equal to the sum, here in the clockwise direction of rotation considered, of:

a travel called "top alignment travel", which makes it possible to pass the registration element 16, and therefore here the core join 6, from the detection position P16_2, to the position of the top point 3_top of the core 3, said top alignment travel therefore corresponding to the distance which separates the offset sensor 17 from the top point 3_top which comes after said offset sensor 17 in the direction of rotation considered (here the clockwise direction), an additional half-turn, that is to say a continued azimuthal rotation equal to 180 degrees, which makes it possible to pass the registration element 16, and therefore here the core join 6, from a position at the top point 3_top to a position at the low point 3_low, bearing in mind that the low point 3_low will correspond, after braiding, to the position of the braid join 8, a travel called "shift travel", which is equal to the desired azimuthal separation distance d_azim, for example 55 mm of arc lengths, and which makes it possible to pass, here in the clockwise direction, the registration element 16, and therefore the core join 6, from the low point 3_low to the final position P16_3, situated at the desired distance from the future braid join 8.

Likewise, in another example in which, this time, a magnetic marking 16_magn diametrically opposite the core join 6 will be used, the positioning travel will be equal to the sum, here in the clockwise direction of rotation considered, of:

a top alignment travel which corresponds to the distance which makes it possible to pass the registration element 16_magn from the detection position P16_2 to the position of the top point 3_top of the core 3, said top alignment travel therefore corresponding here to the distance which separates the magnetic sensor 18 from the top point 3_top which follows said magnetic sensor 18 in the direction of rotation considered (here the clockwise direction); at the same time, the placement of the magnetic marking 16_magn at the top point 3_top has the effect of placing the core join 6 diametrically opposite the low point 3_low, so that it is not necessary to provide an additional half-turn;

a shift travel which is equal to the desired azimuthal separation distance d_azim, for example 55 mm of arc length, and which makes it possible to pass, here in the clockwise direction, the core join 6 from the low point 3_low to a final position, situated at the azimuthal separation distance d_azim from the future braid join 8.

It will also be noted that the detection device 15 and the positioning device 20 preferably share one and the same common guiding and driving mechanism 21, which notably allows the installation 1 to gain in compactness and the azimuth checking system 14 to gain in accuracy, by virtue of the use of a machine reference frame which is common to said detection 15 and positioning 20 devices.

According to a preferential feature which can constitute an invention in its own right, the guiding and driving mechanism 21 is arranged so that the core path T21 that it defines is substantially contained in a vertical plane, as can be seen notably in FIGS. 2, 3, 4, 5 and 7.

To this end, said guiding and driving mechanism 21 preferably comprises, as can be seen notably in FIGS. 3 and 5, one or more supporting members 24 arranged to vertically support the core 3, and at least one driving member 23 arranged to act on the core 3 in order to drive said core in displacement along the core path T21.

The supporting members 24 arranged to vertically support the core 3 will be able to be formed for example by bobbins 24, preferably mounted to rotate freely on horizontal axes.

As indicated above, the at least one driving member 23 will be able to be formed by a friction drive roller 23.

This vertical configuration of the core path T21 amounts to the fact that the guiding and driving mechanism 21 steers and keeps the main axis Z3 of the core 3 substantially horizontal, typically within a range of between +10 degrees and −10 degrees in pitch, preferably between +5 degrees and −5 degrees in pitch, even exactly horizontal.

Such a vertical configuration offers numerous advantages.

A first advantage is that such a vertical configuration makes it possible to exploit gravity to route the core 3 to the core path T21, to engage and to spontaneously self-align, reproducibly and stably, said core 3 in said core path T21. The fetching of the core 3 followed by the manipulation thereof by the guiding and driving mechanism 21 is thus facilitated.

Likewise, such a vertical configuration guarantees a better stability of the core 3 in the handling of said core by its top part, in order for said core 3 to be transferred to the braiding station 7.

A second advantage of the vertical configuration comes from the small footprint of the guiding and driving mechanism 21, which makes it possible to produce a compact installation 1.

A third advantage of the vertical configuration is that it is thus possible to leave free and accessible the bottom part of the core 3, and notably (at least) the bottom half of the core 3, which notably makes it possible to use the low point 3_low of the core 3, that is to say the point of the core 3 which is situated at the lowest altitude (out of all the constituent points of said core 3), as reference, and more particularly as starting point, for the braiding operation.

More particularly, when the core 3 is oriented in azimuth upstream of the braiding station 7, within a guiding and driving mechanism 21 which precedes said braiding station 7, then transferred to said braiding station 7, after the correct azimuthal orientation has been identified and obtained, it is thus possible to retain the azimuthal orientation of the core 3 upon the transfer between the guiding and driving mechanism 21 and the braiding station 7, and more specifically retain the low point 3_low, so that the low point 3_low of the core 3, as said low point is used on the braiding station 7, is the same as the low point 3_low which was previously put in place upon the azimuthal positioning of said core 3 by the guiding and driving mechanism 21.

It is thus easy to retain the link established, by the azimuth checking system 14, between the reference frame of the installation 1, and more particularly the machine reference frame of the braiding station 7, on the one hand, and the reference frame associated with the manipulated core 3 on the other hand, which avoids a loss of reference upon the transfer, and thus guarantees the accuracy of the braiding and then, consequently, the accuracy of the positioning of the braid join 8 with respect to the core join 6.

According to a preferential possible implementation, it will be possible to make the low point 3_low of the core 3, such that this low point 3_low results from the azimuthal positioning of said core 3 by the guiding and driving mechanism 21, coincide with the second angular sector S8 intended to receive the braid join 8, as is illustrated in FIG. 6.

Indeed, said low point 3_low of the core may advantageously be used as starting point for the braiding operation, where the first free end section 4A of the braid wire, which marks the start of the braid wire and therefore precedes the turns of the braid wire 4 wound around the core 3, will consequently be located, then as point of arrival at the end of braiding, where the second free end section 4B of said braid wire 4, which marks the end of the turns and of the braid wire 4, is located.

Thus, the braid join 8, which will be made between the two end sections 4A, 4B of the braid wire 4, will finally be situated at said low point 3_low of the core, as it was implemented on the braiding station 7.

According to a preferential feature which can constitute an invention in its own right, the guiding and driving mechanism 21 is borne by a support 25 that can be adjusted in height, of the boom kind, which makes it possible to adjust, preferably automatically, the altitude of the guiding and driving mechanism 21 according to the annular diameter D3 of the core 3, and thus to position, within a predefined altitude range, reproducibly from one core 3 to another, the low point 3_low of the core 3 which is present at the instant concerned within said guiding and driving mechanism 21.

Advantageously, this gives the installation 1 a great versatility, since it can adapt to different sizes of cores 3, and more globally adapt to the production of different sizes of bead wires 2, of distinct annular diameters D3, while retaining the possibility of, in each case, using the low point 3_low of the core, as said low point 3_low was chosen in the azimuth positioning, as reference in the braiding operation.

Regardless of the annular diameter D3 of the core 3, it will thus be possible to use the low point 3_low of the core as reference point, and more particularly as starting point, for the braiding operation.

The support 25 that is adjustable in height will be able to use any suitable guiding and motorization system to perform an adjustment in height with respect to the frame 11.

As an example, the support 25 may comprise, as is illustrated in FIG. 2, a runner formed by a plate 26, which carries the guiding and driving mechanism 21, and which is mounted to slide in translation along a vertical rail 27, for example by means of a linear ball bearing or by means of a prismatic fitting such as a dovetail.

The vertical displacements of the plate 26 and the holding thereof in the desired vertical position will for example be ensured by a motorized worm screw, coupled to a nut or to a linear bearing secured to said plate 26.

According to a preferential possible embodiment, the guiding and driving mechanism 21 can, as can be seen notably in FIGS. 2, 3 and 7, comprise at least one drive roller 23, preferably with vertical axis of rotation Z23, which comes to bear against the core 3 to drive said core 3 by friction, and, facing said at least one drive roller 23, a counter-roller 28 which defines, with the drive roller 23, an interstice 29 through which the core path T21 passes.

Preferably, said counter-roller 28 is movable, by translation or, preferentially, by swivelling, in a direction called "direction of retraction" F28 that is transverse to the core path T21, and is returned against the core 3 by a return member 30, of the spring or counterweight kind, such that said counter-roller 28 forms a mechanical feeler of an offset sensor 17, capable of detecting the offset 16_offset of the core which constitutes the registration element 16, as is illustrated in FIG. 7.

The counter-roller 28 is preferably mounted to rotate freely on its axis of rotation Z28.

Said axis of rotation Z28 of the counter-roller 28 is preferably borne by a lever 31 which is pivotably mounted 32 on the support 25.

It will be noted that, preferably, the lever 31 can form, by its own weight, the return member 30 which presses the counter-roller 28 against the surface of the core 3. The structure of the offset sensor 17 is thus simplified, and the sensitivity of said offset sensor 17 is enhanced.

Preferably, the lever 31 bears the movable core 33 of a displacement sensor 34, such as a magnetic, capacitive or inductive sensor, for example a displacement sensor 34 with magnetic solenoid switch, such that a movement of the counter-roller 28 away in the direction of retraction F28, provoked by the passage of an offset 16_offset such as a weld bead forming the core join 6, is transmitted, even amplified, by the lever 31, which consequently displaces said movable core 33 and thus allows the detection of the offset 16_offset by the displacement sensor 34, as is illustrated in FIG. 7.

Obviously, the sensitivity threshold of the offset sensor 17, and more particularly of the displacement sensor 34, will be set according to the depth of the expected offset 16_offset, that is to say according to a predetermined value of expected dimensional variation of the cross-section of the core 3.

If necessary, the amplification effect obtained by the lever 31 will make the retraction of the mechanical feeler (counter-roller 28) more easily perceptible, and will therefore facilitate the detection of the registration element 16 of offset 16_offset type, even if said offset 16_offset is of shallow depth.

It will also be noted that the pinching effect exerted on the core 3 present in the interstice 29 by the counter-roller 28, which is returned (here by the weight of the lever 31) against the drive roller 23, ensures a stable guiding and holding of the core 3 in said interstice 29, on the provided core path T21, when said core 3 is borne and/or driven in azimuthal rotation by the guiding and driving mechanism 21, between said roller 23 and counter-roller 28 which are placed on either side of said core 3 and which laterally delimit said core path T21.

Preferably, in the rest position, that is to say when the counter-roller 28 bears against a surface of the core 3 which does not correspond to the offset 16_offset to be detected, the axis of rotation Z28 of the counter-roller 28 is substantially parallel to the axis of rotation Z23 of the drive roller 23.

According to a preferential arrangement, the axis of rotation Z28 of the counter-roller 28 is, at rest, substantially vertical (for example to +/−10 degrees with respect to the vertical), so as to be able to define, with the drive roller 23 with substantially vertical axis, a substantially vertical interstice 29 which favors the insertion of the core 3 into the core path T21 and the guiding of said core 3 in its azimuthal rotation. Such an arrangement is suited in particular to a vertical configuration of the core path T21, the advantages of which have been described above.

It will be noted in this respect that, in projection in a vertical plane containing the main axis of the core Z3, the interstice 29 is then preferably substantially aligned with the grooves of the bobbins 24 intended to vertically support the core 3.

Preferably, the drive roller 23 and/or the counter-roller 28 will also be able to each have at least one chamfered free end 23A, 28A to favor the accommodation and the self-centring of the core in the interstice 29, between said roller 23 and counter-roller 28.

Figure 4:
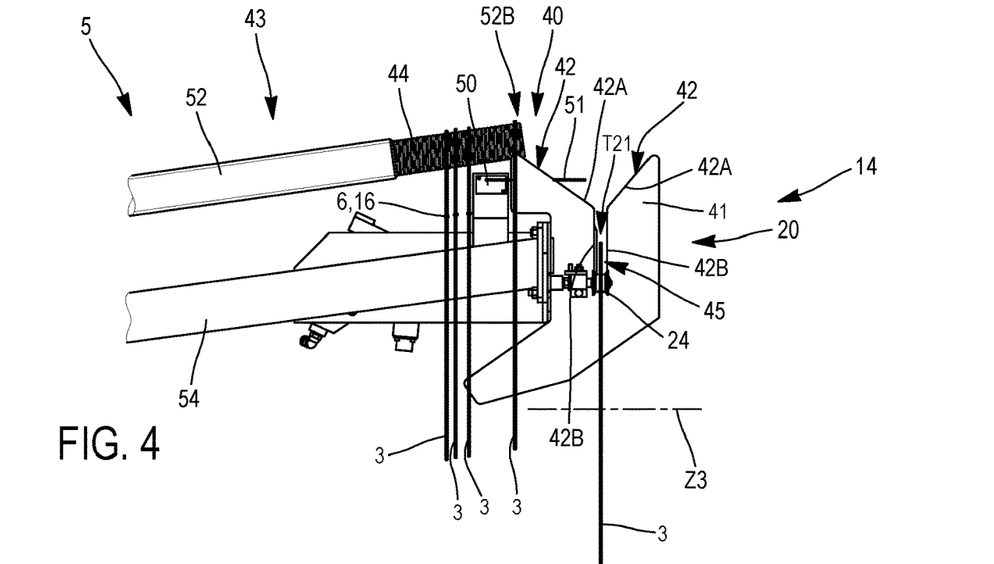
FIG. 4 illustrates, by a side view, the detail of the routing of several successive cores by the fetching device, the latter being provided with a sorting device which comprises, on the one hand, a centring member provided with guiding ramps and, on the other hand, a screw conveyor with worm screw arranged to fetch and release cores one by one vertically above said centring member.

Moreover, according to a preferential feature which can constitute an invention in its own right, the fetching station 5 comprises a sorting device 40 which comprises, on the one hand, a centring member 41 provided with at least one guiding ramp 42 which is arranged to receive a core 3 and allow said core 3 to slip, by gravity, along said guiding ramp 42, to the guiding and driving mechanism 21, and, on the other hand, a conveyor 43, for example a screw conveyor with worm screw 44, arranged to fetch and release cores 3 one by one vertically above the centring member 41, as is notably illustrated in FIG. 4.

Preferably, the guiding member 41 comprises two guiding ramps 42 each having at least one inclined portion 42A, said inclined portions 42A of said two ramps converging substantially towards one another in funnel form to direct the core 3 and allow the latter to be engaged accurately in the core path T21, as is illustrated in FIGS. 3 and 4.

Preferably, said funnel is, to that end, situated, in the extension of, and preferably vertically in line with and above, the interstice 29 delimited between the drive roller 23 and the counter-roller 28.

Furthermore, in the bottom portion of said funnel, the guiding ramps 42 can be extended by substantially parallel straight portions 42B, preferably vertical, which define between them a guiding groove 45 whose width, preferably constant, is slightly greater than the diameter of the cross-section of the core 3, and less than the maximum separation which separates the respective chamfered ends 23A, 28A of the drive roller 23 and of the counter-roller 28, so as to channel the core 3 towards and into the interstice 29.

Preferably, as is illustrated in FIGS. 1 to 3 and 5, it will be possible to provide two centring members 41, disposed on either side of the worm screw 44 of the conveyor 43, and on either side of the subassembly formed by the drive roller 23 and the counter-roller 28, so as to ensure a double guiding of the core towards the interstice 29, by supporting the core 3 by two points of contact which slip along the guiding ramps 42, which makes it possible to distribute the supports of the core 3 and thus gain in accuracy and in stability in the transferring of the core 3 to the guiding and driving mechanism 21.

The centring member or members 41 will for example be able to take the form of plates, fixed to the support 25 that is adjustable in height, preferably forming cheeks placed on each side of the subassembly formed by the drive roller 23 and the counter-roller 28, and in which the guiding ramps 42, and in particular the guiding groove 45, are cut.

Obviously, it would be possible to envisage, as a variant, any type of arrangement of centring members 41, for example by producing the guiding ramps 42 by means of solid rods, of rail type, bent to the desired form.

The guiding groove 45 may be blind, so as to facilitate the production of a single piece of each centring member 41 provided with two convergent ramps 42 which delimit said guiding groove 45.

In such a case, said blind guiding groove 45 will obviously extend to an altitude lower than the altitude occupied by the core 3, with respect to the centring member 41, when said core 3 rests on the bobbins 24, such that the core 3 can freely reach the core path T21, then be driven in rotation by the guiding and driving mechanism 21, without being hampered by the centring member 41.

Moreover, the sorting device 40 preferably comprises a core counter 50, which, for example, comprises a swivelling counting finger 51, and which is designed to detect the actual passage of a core 3 between the conveyor 43 and the guiding and driving mechanism 21.

Such a core counter 50 advantageously makes it possible to check for the presence of a core 3 in the guiding and driving mechanism 21, and/or the absence of a jam of cores 3 between the conveyor 43 and said guiding and driving mechanism 21, before starting the detection of the registration element 16 and the positioning of the core 3 in azimuth.

Advantageously, the use of a swivelling finger 51, which swivels (or which flexes) under the effect of the weight of the core 3, when said core 3 descends from the conveyor 43 to the core path 21 by being guided by the guiding ramps 42 of the guiding member 41, allows for a particularly simple and reliable count.

However, it would be possible, as a variant, to use any equivalent counting device, for example an optical sensor system which would detect the cutting of a wave beam by the passage of a core 3.

According to a preferential feature which can constitute an invention in its own right, the fetching station 5 can comprise a conveyor 43 with worm screw 44, comprising a rotary threaded supporting rod 52 which is arranged so as to be able, as is illustrated in FIG. 4, i) to receive a plurality of cores 3, threaded onto said threaded supporting rod 52, ii) distribute said cores 3 along said threaded supporting rod 52 at one core 3 at most per pitch screw, and iii) convey said cores 3 in translation along said threaded supporting rod 52 when the latter is rotated.

It is thus possible to order the cores 3 and route said cores 3 one by one to the guiding and driving mechanism 21, by means of a simple, robust and compact structure which uses the threaded supporting rod 52 as worm screw 44.

As can be seen notably in FIGS. 1 and 2, the supporting rod 52 can be mounted overhanging, on the same support 25 as the guiding and driving mechanism 21, preferably above a boom arm 54 which bears said guiding and driving mechanism 21 and which is itself preferably fixed onto the support 25 that can be adjusted in height, here on the plate 26 that is mounted to be movable in translation on the rail 27.

The threaded supporting rod 52 and the guiding and driving mechanism 21 will thus preferably be able to be adjusted in height integrally together.

More globally, the fetching station 5, the sorting device 40, and the guiding and driving mechanism 21 will preferably be borne by one and the same support 25, and will thus use one and the same common machine reference frame, which will simplify the management of the cores 3 and will make it possible to gain in accuracy.

Preferably, the threaded supporting rod 52 can be slightly inclined, for example by the order of 5 degrees to 20 degrees with respect to the horizontal, so as to have, on the side of the plate 26 and of the rail 27, a captive first end 52A, which is articulated in rotation, motorized, on the plate 26 and, on the opposite side, vertically in line with the guiding member 41 leading to the guiding and driving mechanism 21, a free second end 52B, the altitude of which is greater than the altitude of the first end 52A.

Advantageously, a slight slope makes it possible to facilitate the distribution of the cores 3 on the threaded supporting rod 52, and therefore the action of sorting the cores 3, under the combined action of the rotation of the threaded supporting rod 52 and of gravity.

In order to limit the deflection of the threaded supporting rod 52 under its own weight and under the weight of the cores 3, an intermediate support 55 will preferably be provided, comprising, for example, two rollers 56, rotating freely, and preferably in barrel form, in order to support the supporting rod 52 between its two ends 52A, 52B, preferably at a distance from the captive first end 52A of between 40% and 70% of the overall length of said threaded supporting rod 52.

The intermediate support 55 may be fixed onto the boom arm 54, and be inserted between said boom arm 54 and the supporting rod 52, in order to combine robustness and compactness, without hindering the storage and the routing of the cores 3.

As can be seen in FIGS. 1 and 2, the supporting rod 52 preferably comprises a shoulder 57, preferably situated substantially at the first end 52A, and which advantageously forms a stop abutment to retain, on said supporting rod 52, the cores 3 awaiting routing, by notably preventing said cores 3 from slipping and falling.

The bottom part of the threaded supporting rod 52 will thus advantageously be able to form a reserve, in which it will be possible to store a defined number of cores 3 awaiting orientation in azimuth and braiding.

The threaded supporting rod 52 will have a thread whose pitch and depth will be dimensioned according to the dimension of the cross-section of the model or models of cores 3 that the installation 1 has to process, so that each hollow undulation of said thread can receive one, and only one, core 3, and convey said core 3 by pushing it progressively to the free end 52B, where the core 3 is dropped into the centring member 41.

Moreover, it will be noted that the detection device 15 and/or at least a part of the positioning device 20, notably the guiding and driving mechanism 21, will be able to be distinct from the braiding station 7, and situated upstream of said braiding station 7, between the fetching station 5 and the braiding station 7, and more particularly between the conveyor 43 and the braiding station 7, as can be seen in FIG. 1.

In such a case, the positioning device 20 will comprise a transfer device 60 making it possible to bring to the braiding station 7, without loss of reference, the core 3 which will have previously been oriented appropriately in azimuth within the guiding and driving mechanism 21.

As a variant, it would however be possible to envisage having the positioning device 20, and if necessary the detection device 15, being situated on the braiding station 7 itself, so that the orientation in azimuth of the core is done directly on said braiding station 7.

In any case, according to a preferential feature which can constitute an invention in its own right, and as is illustrated in FIG. 1, the installation 1 can comprise a transfer device 60 with multiple booms, comprising a common mast 61 which is movable on the one hand in rotation about a vertical axis called "yaw axis" Z61, and, on the other hand, in vertical translation along said yaw axis Z61, and which is provided with at least a first arm 62 and a second arm 63, fixed to said mast 61 and arranged so that, in one and the same movement of the common mast 61, the first arm 62 carries out the transfer of a first core 3 surrounded by its at least one braid wire 4, for example a semi-finished bead wire 2_part, from the braiding station 7 to the sleeve-coupling station 10 or to a storage station 13 which precedes the sleeve-coupling station 10, while, simultaneously, the second arm 63 carries out the transfer of a second core 3 from the fetching station 5, after detection of the registration element 16 and positioning of the core 3 in azimuth, to the braiding station 7.

Advantageously, such a transfer that is combined and synchronized between several, here at least three, successive stations, makes it possible to make savings on structure (and therefore on cost and bulk), on motorization, and on energy. A stable and high rate of production is thus also promoted.

Furthermore, this commonality of movement makes it possible to retain, between the stations, the positioning references which are taken in the reference frame attached to the stations concerned, and more particularly which are taken in the reference frame attached to the frame 11 of the installation 1.

The subassembly comprising the mast 61 and the first arm 62 advantageously forms a first boom, charged with transports between the braiding station 7 and the downstream station (buffer storage station 13 or, directly, sleeve-coupling station 10), while the subassembly comprising this same mast 61 and the second arm 63 advantageously forms a second boom, charged with transports between the fetching station 5 and the braiding station 7, and more particularly between the guiding and driving mechanism 21 and the braiding station 7.

Preferably, the first arm 62 and the second arm 63 are shifted angularly in yaw about the axis Z61 of the mast 61, for example by a value of between 60 degrees and 150 degrees, preferably close or equal to 90 degrees, which contributes notably to the compactness of the installation.

Preferably, the first and second arms 62, 63 may comprise gripping clamps 64 arranged to grip the cores 3 or, respectively, the cores 3 clad with their braid wire 4 (in particular the semi-finished bead wires 2_part).

Preferably, the clamps will ensure the gripping of the cores 3, respectively of the cores 3 clad with their braid wire 4, in a top part thereof, substantially opposite the low point 3_low with respect to the main axis Z3. That way, the core 3 is manipulated by the clamp 64 a little as if it were a basket handle.

The clamps 64 ensure a stable and firm grip, preferably at a gripping section which is situated at the top point 3_top of the core 3, vertically above the low point 3_low, and therefore with respect to which the core is naturally balanced because of its geometry and its own weight.

Thus, advantageously, neither the gripping nor the transfer modify the orientation in azimuth conferred on the core 3 by the azimuth checking system 14.

As is illustrated by the arrows in FIG. 1, the movement of transfer of the core 3 from the fetching station 5 to the braiding station 7, and more particularly from the guiding and driving mechanism 21 to the braiding station 7, will be able to be executed as follows, preferably with respect to the same frame 11 as that with respect to which the height adjustment movements of the support 25 are performed:

- the core 3 having previously been oriented in azimuth, the second arm 63 is placed above the guiding and driving mechanism 21, and more particularly above the free space contained between the two centring members 41;
- the core 3 is released from the guiding and driving mechanism 21, preferably by separating the counter-roller 28 from the drive roller 23;
- the clamp 64 of said second arm 63 opens, and the mast 61 lowers to bring the arm 63, and more particularly the clamp, to the height of the gripping section of the core, here the top point 3_top of the core 3;
- the clamp 64 is closed again on the gripping section of the core 3;
- the mast 61 rises, driving the second arm 63 that bears the core 3;
- the mast 61 pivots yaw-wise, here by a quarter-turn in the counter-clockwise direction in FIG. 1, so as to bring the second arm 63 vertically in line with the braiding station 7;
- the mast 61 lowers, until the core takes its place on the braiding station 7, where the core 3 is then locked in the carousel 7A by a mechanical tensioning.

It will be noted that, advantageously, the manipulations of the core 3 by the transfer device 60 do not alter the orientation in azimuth of the core 3, between the azimuth checking operation and the braiding operation, which avoids any loss of reference.

It will also be noted that, preferably, it will be possible to provide a releasing device 70 which makes it possible to release the core 3 from the guiding and driving mechanism 21 once said core has been positioned appropriately in azimuth, without modifying or disturbing said orientation in azimuth.

Preferably, said releasing device 70 will be arranged so as to be able, on command, to maneuver the counter-roller 28 back, in the direction of retraction F28, so as to separate the counter-roller 28 from the drive roller 23 and thus release the core 3.

More preferentially, said releasing device 70 may for example comprise, to this end, as is illustrated in FIGS. 3 and 7, a ram jack 71 which acts on a pad 72 in order to lift the lever 31, and thus swivel the counter-roller 28 in the direction of retraction F28.

The movements carried out by the first boom, comprising the mast 61 and the first arm 62 provided with its clamp 64, to carry out the transfer of the semi-finished bead wire 2_part from the braiding station 7 to the buffer storage station 13 or the sleeve-coupling station 10, will be deduced mutatis mutandis from the transfer movements described above.

The disclosure relates also obviously to a method making it possible to carry out any one or other of the operations or combinations of operations described in the above.

The disclosure can therefore relate, very generally, to a method for producing a bead wire 2, during which an azimuth checking step is performed in order to deliberately position the braid join 8 at a given minimum separation distance d_azim from the core join 6, preferably at a separation distance d_azim equal to or greater than 10 degrees, and/or equal to or greater than 40 mm of arc length.

More particularly, the disclosure relates to a method for manufacturing a bead wire 2 intended for the reinforcement of a tire, such as a pneumatic tire, said method comprising:
- a step (a) of procurement of a core during which a core 3 is procured which forms a ring having a main axis Z3, said core 3 being to that end kept closed on itself at a join called "core join" 6 which occupies, in azimuth about said main axis Z3, a first angular sector S6,
- a braid step (d) during which at least one wire, called "braid wire" 4, is helically wound about the core 3, over at least one turn about the main axis Z3,
- a step (e) of production of a braid join 8, during which a join is made, preferably by means of a crimped braid sleeve 9, between a first end section of the braid wire 4A and a second end section of the braid wire 4B in order to keep said braid wire 4 closed on itself about said main axis Z3, said braid join occupying, in azimuth about the main axis Z3, a second angular sector S8.

According to the disclosure, said method comprises:
- a detection step (b) during which a registration element 16, with respect to which the position of the first angular sector S6 is known, is sought and detected on the core 3,
- a positioning step (c) during which said registration element 16 is taken into consideration to adapt the orientation in azimuth of said core 3, with reference to said registration element 16, upon the implementation of the braiding step (d), such that, at the end of the steps (d) of braiding and then (e) of production of the braid join 8, the second angular sector S8 occupied by the braid join 8 does not overlap the first angular sector S6 occupied by the core join 6.

Obviously, the disclosure is in no way limited to just the variant embodiments described in the above, the person skilled in the art being notably able to isolate or freely combine between them one or other of the abovementioned features, or replace them with equivalents.

What is claimed is:

1. A method for producing a bead wire intended for the reinforcement of a tire, such as a pneumatic tire, said method comprising:
   a step (a) of procurement of a core during which a core is procured which forms a ring having a main axis, said core being in f act held closed on itself at a core junction which occupies, in azimuth about said main axis, a first angular sector,
   a braiding step (d) during which at least one braid wire is helically wound about the core, over at least one turn about the main axis,
   a step (e) of production of a braid junction, during which a first end section of the braid wire and a second end section of the braid wire are joined together by crimping a braid sleeve about the first end section of the braid wire or by welding the first end section of the braid wire and the second end section of the braid wire together in order to keep said braid wire closed on itself about said main axis, said braid junction occupying, in azimuth about the main axis, a second angular sector,
   a detection step (b) during which a registration element, with respect to which the position of the first angular sector is known, is sought and detected on the core,
   a positioning step (c) during which said registration element is taken into consideration to adapt the azimuthal orientation of said core, with reference to said registration element, upon the implementation of the braiding step (d), so that, at the end of the steps (d) of braiding and then (e) of production of the braid junction, the second angular sector occupied by the braid junction does not overlap the first angular sector occupied by the core junction.

2. An installation for preparing bead wires intended for the reinforcement of a tire said installation comprising:
   a fetching station, arranged to fetch a core of a plurality of cores, the core forming a ring having a main axis, said core being kept closed on itself at a core junction which occupies, in azimuth about said main axis, a first angular sector,
   a braiding station including a driving carousel that is adapted to drive the core in azimuth rotation about said main axis and a rotary reel that rotates about a tangent of the core to interleave at least one braid wire helically about the core over at least one turn about the main axis by providing, in azimuth about the main axis, a second angular sector which is intended to accommodate a braid junction between a first end section of the at least one braid wire and a second end section of the at least one braid wire in order to keep said at least one braid wire closed on itself about said main axis,
said installation comprising an azimuth checking system which comprises:
   at least one of an offset sensor, a magnetic sensor, and an optical sensor arranged to detect on the core a registration element with respect to which the position of the first angular sector is known,
   and a positioning device that includes at least one drive roller that rotates the core to adapt an azimuthal orientation of said core, with reference to said registration element, for the implementation of said core on the braiding station, so that the second angular sector occupied by the braid junction does not overlap the first angular sector occupied by the core junction.

3. The installation according to claim 2, wherein the azimuth checking system is arranged to reproducibly place the second angular sector occupied by the braid junction at a minimal azimuthal separation distance from the first angular sector occupied by the core junction, the minimal azimuthal separation distance being is equal to or greater than 10 degrees.

4. The installation according to claim 2, wherein the at least one of the offset sensor, the magnetic sensor, and the optical sensor includes the offset sensor which is arranged to scan a surface of the core in order to detect an offset which is formed on the surface of the core and which constitutes the registration element.

5. The installation according to claim 2, wherein the at least one of the offset sensor, the magnetic sensor, and the optical sensor includes the a magnetic sensor arranged to detect on the core a registration element formed by a magnetic marking.

6. The installation according to claim 2, wherein the fetching station comprises a screw conveyor with worm screw, comprising a rotary threaded supporting rod which is arranged so as to be able to i) receive the plurality of cores, threaded onto said threaded supporting rod, ii) distribute said cores along said threaded supporting rod at one core at most per screw pitch, and iii) convey said cores in translation along said threaded supporting rod when said supporting rod is rotated.

7. The installation according to claim 2, further comprising a sleeve-coupling station, arranged to join and fix to one another the first end section of the braid wire and the second end section of the braid wire by means of a braid sleeve which is crimped in the second angular sector.

8. The installation according to claim 7, further comprising a transfer device with multiple booms, comprising a common mast which is movable in rotation about a vertically extending yaw axis and in vertical translation along said yaw axis, and which is provided with at least a first arm and a second arm, the first arm and the second arm being fixed to said mast and arranged in such a way that, in one and the same movement of the common mast, the first arm carries out the transfer of a first core surrounded by its at least one braid wire from the braiding station to the sleeve-coupling station or to a storage station which precedes the sleeve-coupling station, while, simultaneously, the second arm carries out the transfer of a second core from the fetching station, after detection of the registration element and positioning of the core in azimuth, to the braiding station.

9. Installation according to claim 2, wherein the positioning device includes a guiding and driving mechanism that includes the at least one drive roller and at least one counter-roller that are arranged to guide and drive the core in azimuthal rotation along a core path that extends around the main axis so as to be able to rotate the core until the detection device detects the registration element, then adjust the azimuthal position of said core with respect to said registration element.

10. The installation according to claim 9, wherein the at least one drive roller has a vertical axis of rotation and comes to bear against the core to drive said core by friction, the at least one drive roller and the at least one counter-roller defining an interstice through which the core path passes, said counter-roller being movable, by translation or by swivelling, in a direction of retraction that is transverse to the core path, and returned against the core by a return member such that said counter-roller forms a mechanical feeler of the offset sensor that is capable of detecting the offset of the core.

11. The installation according to claim 9, wherein the guiding and driving mechanism is arranged so that the core path is substantially contained in a vertical plane, said guiding and driving mechanism comprising one or more supporting members arranged to vertically support the core.

12. The installation according to claim 11, wherein the guiding and driving mechanism is borne by a support that can be adjusted in height such that an altitude of said guiding and driving mechanism can be adjusted within a predefined altitude range to accommodate cores of different annular diameters.

13. The installation according to claim 9, wherein the fetching station comprises a sorting device which includes a centering member provided with at least one guiding ramp which is arranged to receive the core and allow said core to slip, by gravity, along said guiding ramp, to the guiding and driving mechanism, and includes a conveyor arranged to fetch and release the cores one by one vertically above the centering member.

14. The installation according to claim 13, wherein the sorting device comprises a core counter, which core counter is designed to detect the actual passage of one core between the conveyor and the guiding and driving mechanism.

* * * * *